United States Patent
Bartolini et al.

(10) Patent No.: US 8,440,152 B2
(45) Date of Patent: May 14, 2013

(54) PROCESS FOR RECOVERING METALS FROM A STREAM RICH IN HYDROCARBONS AND CARBONACEOUS RESIDUES

(75) Inventors: Andrea Bartolini, San Giuliano Milanese (IT); Ugo Cornaro, Seriate (IT); Paolo Pollesel, San Donato Milanese (IT); Paul Dominique Oudenne, Liege (BE)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 13/377,036

(22) PCT Filed: Jun. 1, 2010

(86) PCT No.: PCT/EP2010/003345
§ 371 (c)(1),
(2), (4) Date: Feb. 16, 2012

(87) PCT Pub. No.: WO2010/142397
PCT Pub. Date: Dec. 16, 2010

(65) Prior Publication Data
US 2012/0134899 A1     May 31, 2012

(30) Foreign Application Priority Data
Jun. 10, 2009    (IT) ............................. MI2009A1023

(51) Int. Cl.
     *C22B 3/00*      (2006.01)
(52) U.S. Cl.
     USPC .................... 423/1; 423/53; 423/68; 423/138
(58) Field of Classification Search .......... 423/1, 53–68, 423/138–154; 502/20–56
See application file for complete search history.

(56) References Cited

U.S. PATENT DOCUMENTS 4,285,804 A * 8/1981 Jacquin et al. .............. 208/48 R
4,557,821 A    12/1985 Lopez et al.
(Continued)

FOREIGN PATENT DOCUMENTS

| EP | 0 145 105 | 6/1985 |
|---|---|---|
| EP | 0 304 682 | 3/1989 |
| WO | 2004 056946 | 7/2004 |

OTHER PUBLICATIONS

International Search Report Issued Mar. 11, 2011 in PCT/EP10/003345 Filed Jun. 1, 2010.
(Continued)

*Primary Examiner* — Steven Bos
(74) *Attorney, Agent, or Firm* — Oblon, Spivak, McClelland, Maier & Neustadt, L.L.P.

(57) ABSTRACT

A process for recovering metals from a stream rich in hydrocarbons and carbonaceous residues by means of a treatment section, characterized in that it comprises the following steps: sending said stream to a primary treatment, effected in one or more steps, wherein said stream is treated in the presence of a fluxant agent in a suitable apparatus, at a temperature ranging from 80 to 180° C., preferably from 100 to 160° C., and subjected to liquid/solid separation in order to obtain a clarified product essentially consisting of liquids and a cake (oil-cake); possibly subjecting the separated cake to drying, in order to remove the hydrocarbon component having a boiling point lower than a temperature ranging from 300 to 350° C. from the cake; sending the cake, possibly dried, to a secondary thermal treatment comprising: a flameless pyrolysis of the cake effected between 400 and 800° C., preferably between 500 and 670° C.; an oxidation of the pyrolysis residue effected in an oxidizing environment and at temperatures ranging from 400 to 800° C., preferably from 500 to 700° C.

22 Claims, 5 Drawing Sheets

U.S. PATENT DOCUMENTS

| | | |
|---|---|---|
| 5,008,001 A | 4/1991 | Kitamura et al. |
| 5,094,991 A | 3/1992 | Lopez et al. |
| 2002/0183403 A1 | 12/2002 | Huang et al. |
| 2004/0259963 A1 | 12/2004 | Huang et al. |
| 2006/0163115 A1 | 7/2006 | Montanari et al. |

OTHER PUBLICATIONS

U.S. Appl. No. 13/516,045, filed Jul. 24, 2012, Bartolini, et al.

* cited by examiner

PROCESS FOR RECOVERING METALS FROM A STREAM RICH IN HYDROCARBONS AND CARBONACEOUS RESIDUES

The present invention relates to a process for recovering metals from a stream rich in hydrocarbons and carbonaceous residues, wherein the metals can be dispersed in the form of aggregates having dimensions substantially lower than a millimeter, such as for example in purging streams from hydrotreatment processes in slurry phase.

Various processes for the conversion of heavy feedstocks, such as heavy and extra-heavy crude oils, and distillation residues from crude oil, by means of hydrotreatment in slurry phase, are known in patent literature.

Some processes comprise the combined use of three process units: hydrotreatment with catalysts in slurry phase of the heavy feedstock, distillation or flash of the product leaving the hydrotreatment, deasphaltation in the presence of solvents of the distillation residue or liquid leaving the flash unit containing the catalyst in dispersed phase, rich in metallic sulfides produced by demetallation of the feedstock and possibly coke (IT-MI95A1095; IT-MI2001A001438; IT-MI2004A2446).

In the processes described above, it is generally necessary to effect a purging to prevent compounds such as sulfides of the metals present in the starting feedstock from accumulating excessively in the hydrotreatment reactor, which can be effected according to the process on the asphaltene stream leaving the deasphaltation section or on the distillation residue or liquid leaving the flash unit.

In order to significantly reduce the entity and enable at least part of the catalyst, which is still active, to be recycled, patent application IT-MI2003A000693 proposes the insertion of a secondary post-treatment section of the purging stream.

In this patent application, the purging stream is sent to a treatment section with a suitable solvent for the separation of the product into a solid fraction and a liquid fraction from which said solvent can be subsequently removed.

The treatment section of the purging effluent, preferably in a quantity ranging from 0.5 to 10% by volume with respect to the fresh feedstock, consists in a de-oiling step with a solvent (toluene or gas oil or other streams rich in aromatic compounds) and a separation of the solid fraction from the liquid fraction.

The solid fraction can be disposed of as such or, more advantageously, can be sent to a selective recovery treatment of the transition metal or metals contained in the transition catalyst (for example Mo) with respect to the other metals present in the starting residue (for example Ni and V), so as to effect the possible recycling of the stream rich in the transition metal (Mo) to the hydrotreatment reactor.

The de-oiling step consists in the treatment of the purging stream, which represents a minimum fraction of the asphaltene stream coming from the deasphaltation section (SDA) to the primary hydrotreatment plant of the heavy feedstock, with a solvent which is capable of bringing the highest possible quantity of organic compounds to liquid phase, leaving the metal sulfides, coke and more refractory carbonaceous residues (toluene-insolubles or similar products) in solid phase.

After the mixing phase between the solvent and purge stream has been completed, the effluent, maintained under stirring, is sent to a separation section of the liquid phase from the solid phase, for example by decanting, centrifugation or filtration.

The liquid phase can then be sent to a stripping and recovery phase of the solvent, which is recycled to the first treatment step (de-oiling) of the purging stream, or it can be recycled to the hydrotreatment reactor.

Other recent patent applications (IT-MI2007A1045, IT-MI2007A1044) on the hydroconversion of heavy oils describe processes which comprise sending the heavy oil to a hydrotreatment step effected in a suitable solid accumulation reactor with a hydrogenation catalyst in slurry phase, into which hydrogen is introduced, obtaining the conversion products in steam phase and in which the solids supplied and generated by the heavy oils to be converted are removed by purging.

Another recent patent application (IT-MI2007A1198) on the hydroconversion of heavy oils describes a process which comprises sending the heavy oil to a hydroconversion area effected in one or more ebullated bed reactors into which hydrogen is introduced in the presence of both a suitable hydroconversion, heterogeneous, supported catalyst and a suitable hydrogenation catalyst nano-dispersed in the heavy oil and sending the effluent stream from the hydroconversion area to a separation area in which the liquid fraction separated, containing the nano-dispersed catalyst, is recycled to the ebullated bed reactors except for a purge.

Also in these recent applications, a purge is always necessary to prevent the above compounds from accumulating excessively in the hydrotreatment reactor.

In all of the processes mentioned above, the volumes of the purge stream, although extremely limited with respect to other hydrotreatment technologies, in any case create considerable problems relating to their use or disposal.

It has now been found that the purging streams of hydrotreatment processes in slurry phase, of which some have been described above, can be treated by means of a process which is composed of a primary treatment, in which at least 50% of the hydrocarbon component is separated by means of physical treatment and made available for recycling to the hydrotreatment unit or energy upgrading, and a subsequent secondary thermal treatment, in which the fraction containing the metallic part is initially subjected to flameless pyrolysis followed by oxidation under controlled temperature conditions to remove the carbonaceous residue, in this way obtaining a final product, essentially consisting of sulfides/inorganic oxides, suitable for a selective recovery of the metallic components.

The process claimed also allows the treatment of feedstocks containing significant quantities of metals which could generate volatile compounds, for example molybdenum oxide (VI).

The strategic advantage consists in the recovery and re-use of the active principle of the process catalyst.

Large quantities of valuable metals such as, for example, nickel and vanadium, which are used in the metallurgical industry, are also recovered.

Finally, the primary treatment makes quantities of hydrocarbons re-available for the process, which would otherwise be sent for disposal, thus significantly reducing the volume of bitumens to be disposed of and at the same time increasing the overall yield of the hydrotreatment process.

Figure 1:
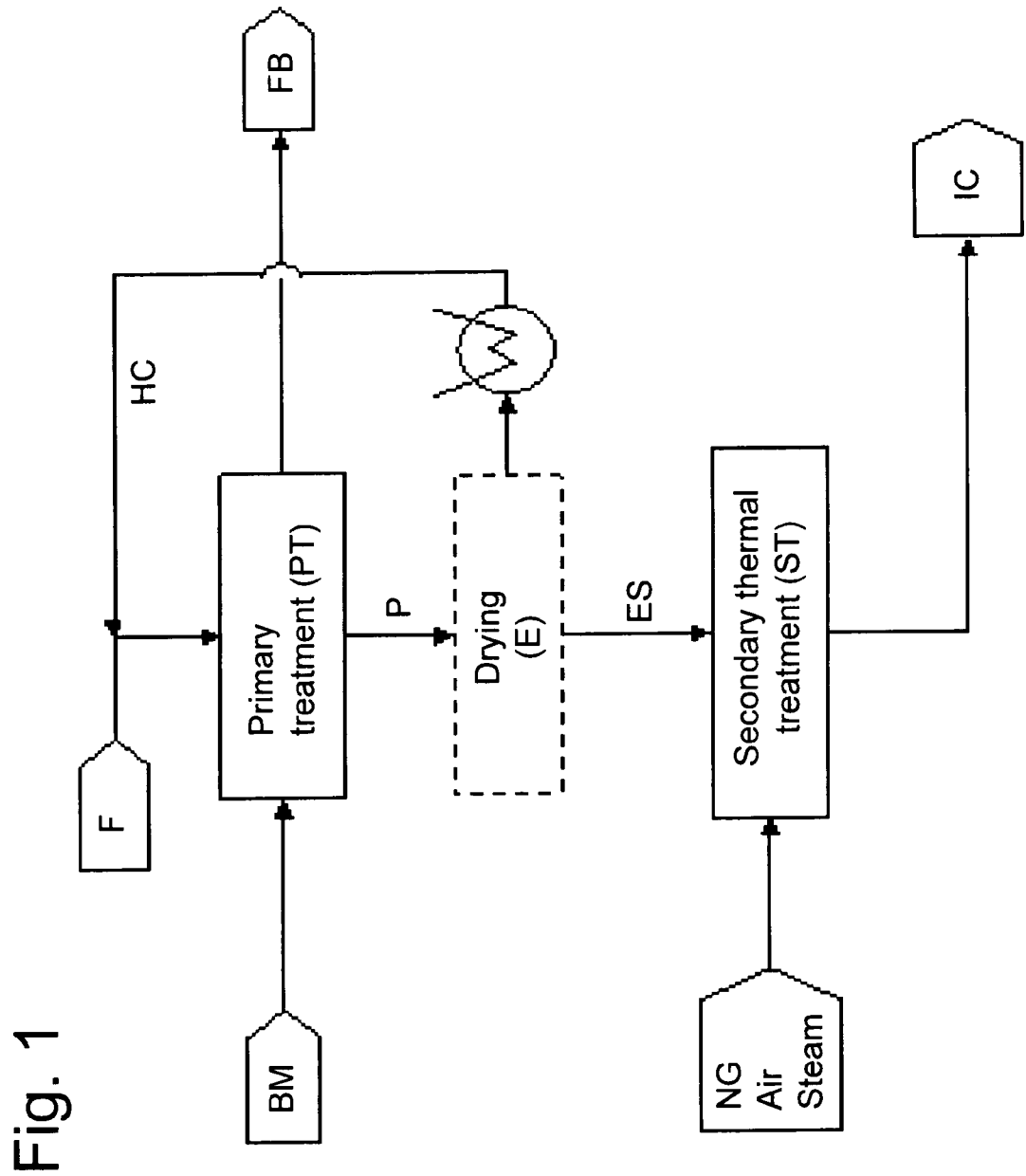
FIG. 1 shows a schematic of an embodiment of the invention.

The process, object of the present invention, for recovering metals from a stream rich in hydrocarbons and carbonaceous residues by means of a treatment section is characterized in that it comprises the following steps:

sending said stream to a primary treatment, effected in one or more steps, wherein said stream is treated in the presence of a fluxant agent in a suitable apparatus, at a temperature ranging from 80 to 180° C., preferably from 100 to 160° C., and subjected to liquid/solid separation in order to obtain a clarified product essentially consisting of liquids and a cake (oilcake);

possibly subjecting the separated cake to drying, in order to remove the hydrocarbon component having a boiling point lower than a temperature ranging from 300 to 350° C. from the cake;

sending the cake, possibly dried, to a secondary thermal treatment comprising:
a flameless pyrolysis of the cake effected between 400 and 800° C., preferably between 500 and 670° C.;
an oxidation of the pyrolysis residue effected in an oxidizing environment and at temperatures ranging from 400 to 800° C., preferably from 500 to 700° C.

The streams to be treated, such as purging streams, can generally be bituminous mixtures consisting, for example, of:
Solids (i.e. components not soluble in tetrahydrofuran);
Metallic species (prevalently sulfides of Ni, V, Fe, Mo, Cr);
Carbonaceous residues;
Liquids (i.e. components soluble in tetrahydrofuran);
Hydrocarbons (substantially with a boiling point higher than 170° C.)
Asphaltenes
Sulfurized organic species
nitrogenated organic species The fluxant agent, whose function is to:
reduce the content of asphaltenes associated with the cake phase by means of simple mixing
reduce the viscosity of the stream sent for enrichment of the "solids" in the cake phase, is preferably selected from the streams available in the plant which have a pour point lower than 150° C., for example VGO (Vacuum Gas Oil) and LCO (Light Cycle Oil).

The primary treatment step, which is effected with the purpose of:
reducing the weight of the "liquids" associated with the "solids" by a factor of at least 2
maintaining at least 80% of the solids in the cake phase, can be effected in a single step or in various steps, preferably from 2 to 5.

An advantage of the multistep treatment is a more marked reduction in the content of asphaltenes and hydrocarbons with a boiling point higher than 300° C. in the cake phase and a more easily transportable cake.

In the case of a single fluxant step, it is preferably in equicurrent with respect to the stream to be treated.

In the case of various steps, fluxant is preferably in countercurrent with respect to the stream to be treated, as, in every step, the solid separated in the separation is sent to the subsequent treatment step, the liquid separated in the separation is recycled, as fluxant agent, to the previous treatment step.

This primary treatment is effected in apparatuses which allow separation by means of physical treatments based on the different liquid-solid density/dimensions, such as, in particular, filter-presses, centrifuges and decanter centrifuges. A decanter centrifuge is the preferred apparatus.

In the case of several steps, the apparatuses can be different, it being preferable, however, for a decanter centrifuge adopted in the first step.

The optional drying step is aimed at completely removing the hydrocarbon fraction having a boiling point lower than 300-350° C. from the cake phase.

It is preferably carried out by moving the final cake under heat and in an inert atmosphere, at temperatures preferably up to 350° C., more preferably up to 280° C., and at pressures preferably of 1 bar or under vacuum up to 0.05 bar, and in a possible fluxant of inert gas (for example nitrogen).

Among the advantages of the drying operation is the formation of an end-product which can be easily transported and stored.

The secondary thermal treatment step is preferably effected under plug-flow transport conditions or close to this. Suitable apparatuses for effecting this treatment can be furnaces of the "Multiple Hearth Furnace" (MHF) type or drum-type furnaces equipped with suitable internal elements for effecting a Plug-Flow type movement; the MHF type is preferred.

The treatment consists of the following steps which can be effected in the same vessel or in a succession of furnaces:
pyrolysis
oxidation The flameless pyrolysis step allows the last traces of hydrocarbons to be removed from the cake phase whereas asphaltenes and heavy products decompose and form a further carbonaceous residue.

This step is preferably effected in the presence of air, steam and natural gas or equivalent gas in which the air is more preferably in a substoichiometric quantity.

During the pyrolysis, an inert solid (for example silica, alumino-silicates, alumina, alumina modified with silica or rare earth, rare earth oxides), can be added to facilitate the moving of the solid in the furnace and subsequent oxidation phase; this solid is then separated from the final product (for example by sieving) and finally recycled.

When MHF furnaces are used, it is advisable to operate with the teeth of the rabbling arms at least partially immersed in the inert bed, preferably at least 30% with respect to the height of the tooth.

By operating in this way, the dimension of the pyrolysis residue is controlled, preventing the growth of agglomerates with dimensions which are such as to block the internal passages of the furnace.

The oxidation is carried out to reduce the carbonaceous residue to the desired content (preferably lower than 10% w). During the same operation, most of the metallic sulfides are converted to the corresponding oxides.

Between the pyrolysis step and oxidation step, a cooling step can be optionally effected.

The pyrolysis step and oxidation step can be effected in more than one furnace or in the same apparatus: in the latter case, a cooling stripping step is preferably also effected between the pyrolysis step and oxidation step.

This cooling stripping step is effected to prevent the inlet of hydrocarbons from pyrolysis in the oxidation phase, to prevent the inlet of oxygen from oxidation in the pyrolysis phase and reduce the temperature of the solids to values within the range of 450-600° C., preferably to values within the range of 500-630° C. The operation is effected by sending steam or another inert gas.

If a single vessel is used, it is preferable to provide the step in which the pyrolysis takes place with a number of rabbling arms higher than that present in the steps in which the oxidation takes place.

In the case of a succession of furnaces, it is preferable to increase the rotation rate of the pyrolysis furnace compared to that of the oxidation furnace in order to obtain a pyrolysis residue having more homogeneous dimensions.

Again in the case of a succession of furnaces, a separation step of the fine powders (<0.5 mm) from the agglomerates can be possibly introduced, before sending the product to the oxidation step; the fine products thus recovered can be recycled to the pyrolysis step or to steps upstream, for example drying.

Some embodiments of the present invention are now provided with the help of the enclosed figures which however should not be considered as limiting the scope of the invention itself.

In FIG. 1, the process object of the present invention is schematized in general.

The bituminous mixture (BM) is subjected to a primary treatment (PT) in the presence of a fluxant agent (F) thus separating a substantially liquid stream (FB), the flushed bitumen (to be recycled to the hydrotreatment unit), and a solid (P), the cake, which is preferably sent to drying (E) before being subjected to a secondary thermal treatment (ST).

The hydrocarbons with a boiling point lower than 300-350° C. (HC) are recovered by drying, which can be recycled to the primary treatment step (PT) and/or sent to the flare.

The cake, possibly dried (ES), is sent to the secondary thermal treatment step (ST) effected in the presence of air, steam and natural gas or equivalent gas (NG) from which inorganic ashes (IC) are obtained, to be subjected to further treatment.

Figure 2:
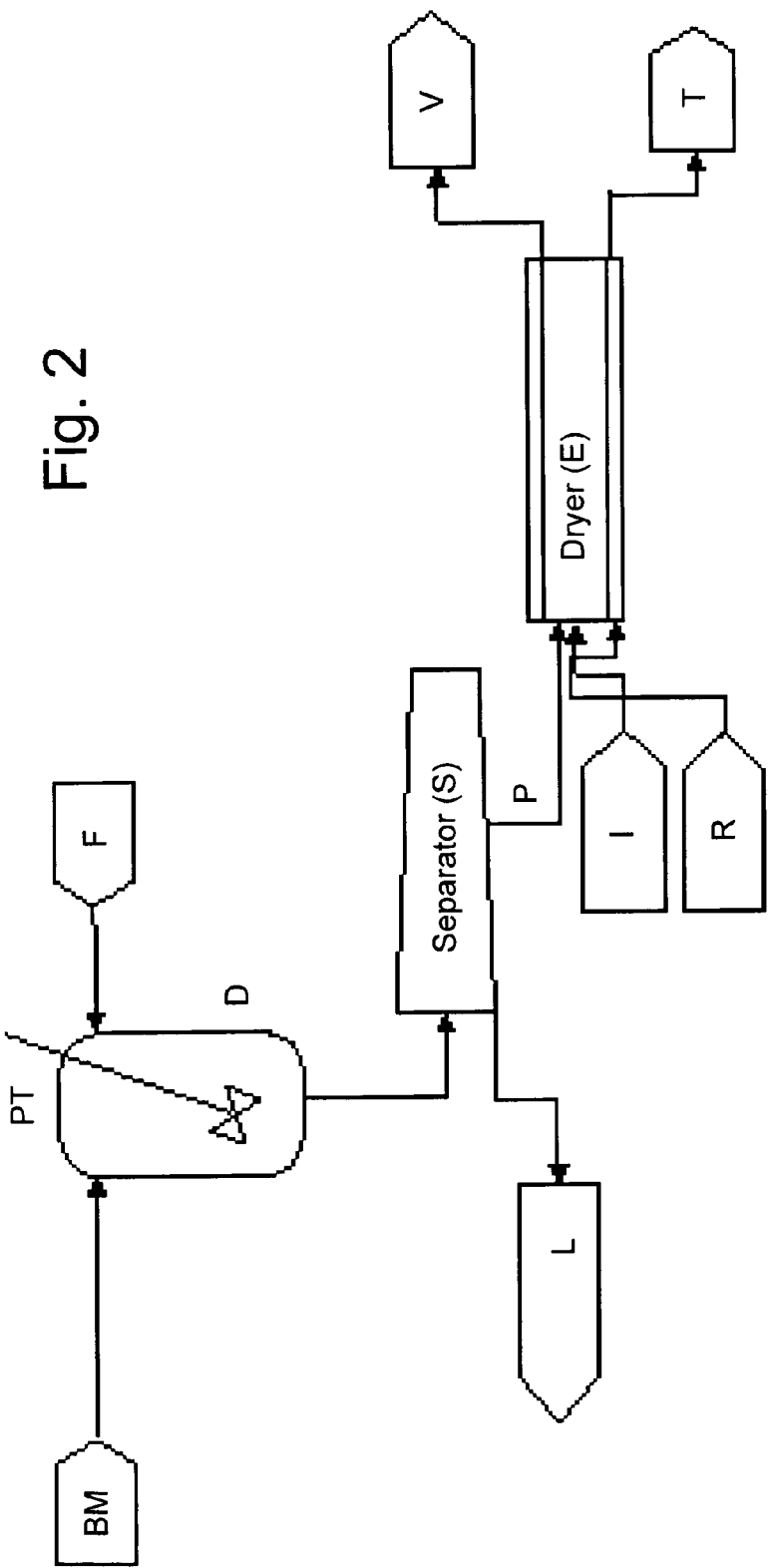
FIG. 2 shows a schematic of a primary treatment in one embodiment of the invention.

In FIG. 2, the primary treatment effected with a single step and the possible subsequent drying step is schematized.

The bituminous mixture (BM) is subjected to primary treatment (PT) in suitable equipment (for example a decanter centrifuge (S)), after mixing in a suitable stirred vessel (D) with a fluxant agent (F) in co-current with respect to the bituminous mixture, separating it in the separator (S) into a liquid (L), the clarified product, in which small quantities of solids can be present, and into a solid (P), the cake, which is sent to a dryer (E) in which an inert gas (I), for example nitrogen, and a heating means (R) (vapour, thermal oil, etc.) are also fed, in order to obtain a dried cake (T) and an evaporated product (V).

Figure 3:
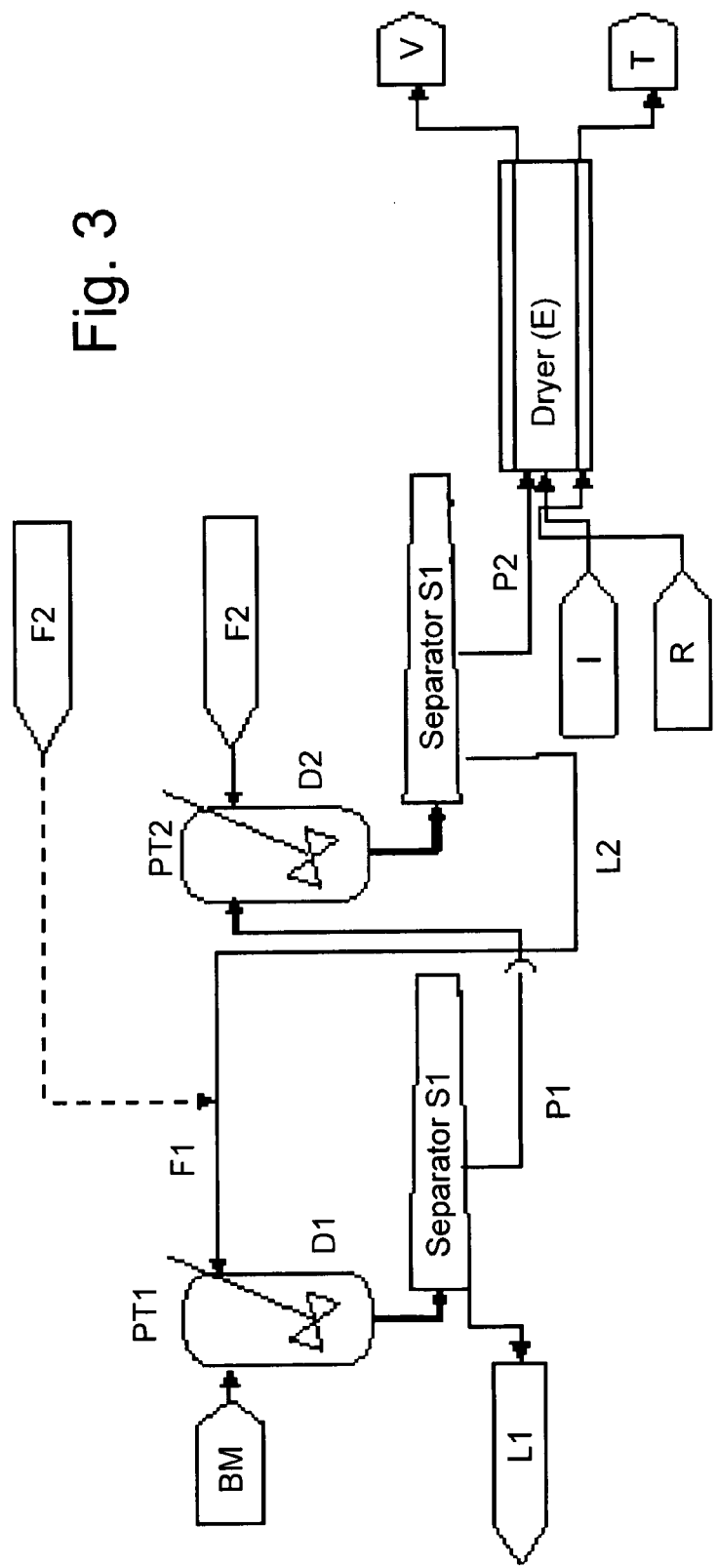
FIG. 3 shows a schematic of an embodiment of the invention in which a primary treatment is effected in two steps.

In FIG. 3, the primary treatment effected in multistep (2 steps) and possible subsequent drying is schematized.

The bituminous mixture (BM) is subjected to a first primary treatment step (PT1) in a suitable apparatus (for example a decanter centrifuge (S1)) with a fluxant agent (F1) in countercurrent with respect to the bituminous mixture, separating it in the separator (S1) into a liquid (L1), the final clarified product, and into a solid (P1), the intermediate cake, which is sent to the second primary treatment step (PT2) effected in another suitable apparatus (for example a decanter centrifuge (S2)), with a fluxant agent (F2), again in countercurrent, separating it into a liquid (L2), the intermediate clarified product, which is recycled and used, possibly after the addition of further fresh fluxant agent, such as the fluxant agent (F1) in the first step, and into a solid (P2), the final cake, which is sent to a dryer (E) in which an inert gas (I), for example nitrogen, and a heating means (R) (vapour, thermal oil, etc.) are also fed, in order to obtain a dried cake (T) and an evaporated product (V).

Figure 4:
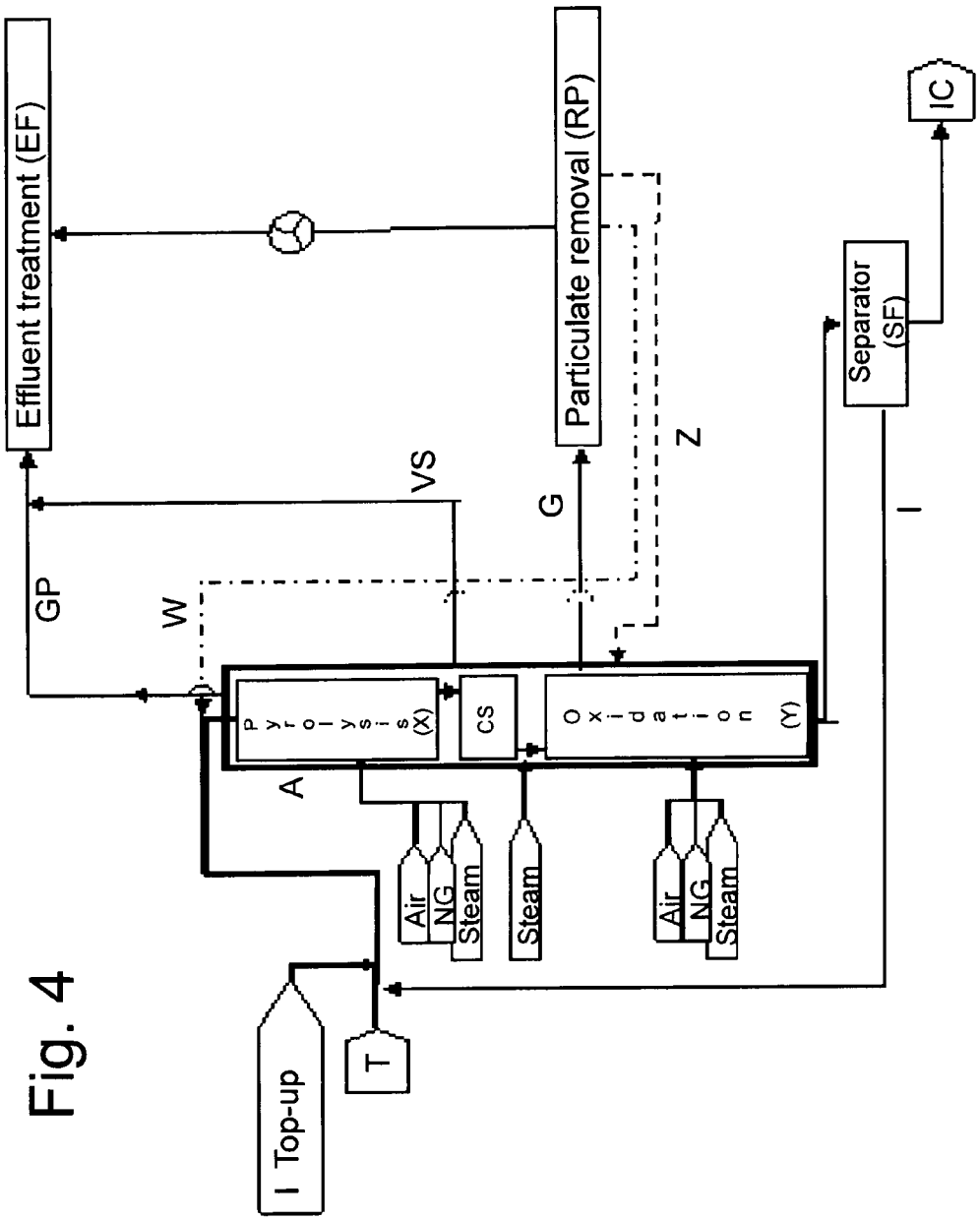
FIG. 4 shows a schematic of a secondary thermal treatment effected in a single vessel.

FIG. 4 schematizes the secondary thermal treatment effected in a single vessel.

The cake (T), possibly dried, is sent to an apparatus (A) in which the pyrolysis and oxidation phases are carried out. An inert solid is co-fed to the same apparatus.

The cake is subjected first to pyrolysis (X) in the presence of sub-stoichiometric air, natural gas or equivalent gas (NG) and vapour, then to cooling stripping (CS) by means of vapour, followed by oxidation (Y) by means of super-stoichiometric air, natural gas or equivalent gas and vapour.

The solid product leaving the apparatus is subjected to separation (SF) in order to separate the inert products (I), which are recycled upstream of the pyrolysis, from the inorganic ashes (IC).

The gases leaving the pyrolysis section, pyrolysis gas (GP), ($H_2$, $CH_4$, CO, etc.), the steam leaving the cooling stripping section (VS) and the gas leaving the oxidation section (G), after removing the particulate re-introduced (Z) in the oxidation and/or possibly recycled (W) upstream of the pyrolysis, are subjected to an effluent treatment (EF), for example post-combustion plus removal of $SO_x/NO_x$).

Figure 5:
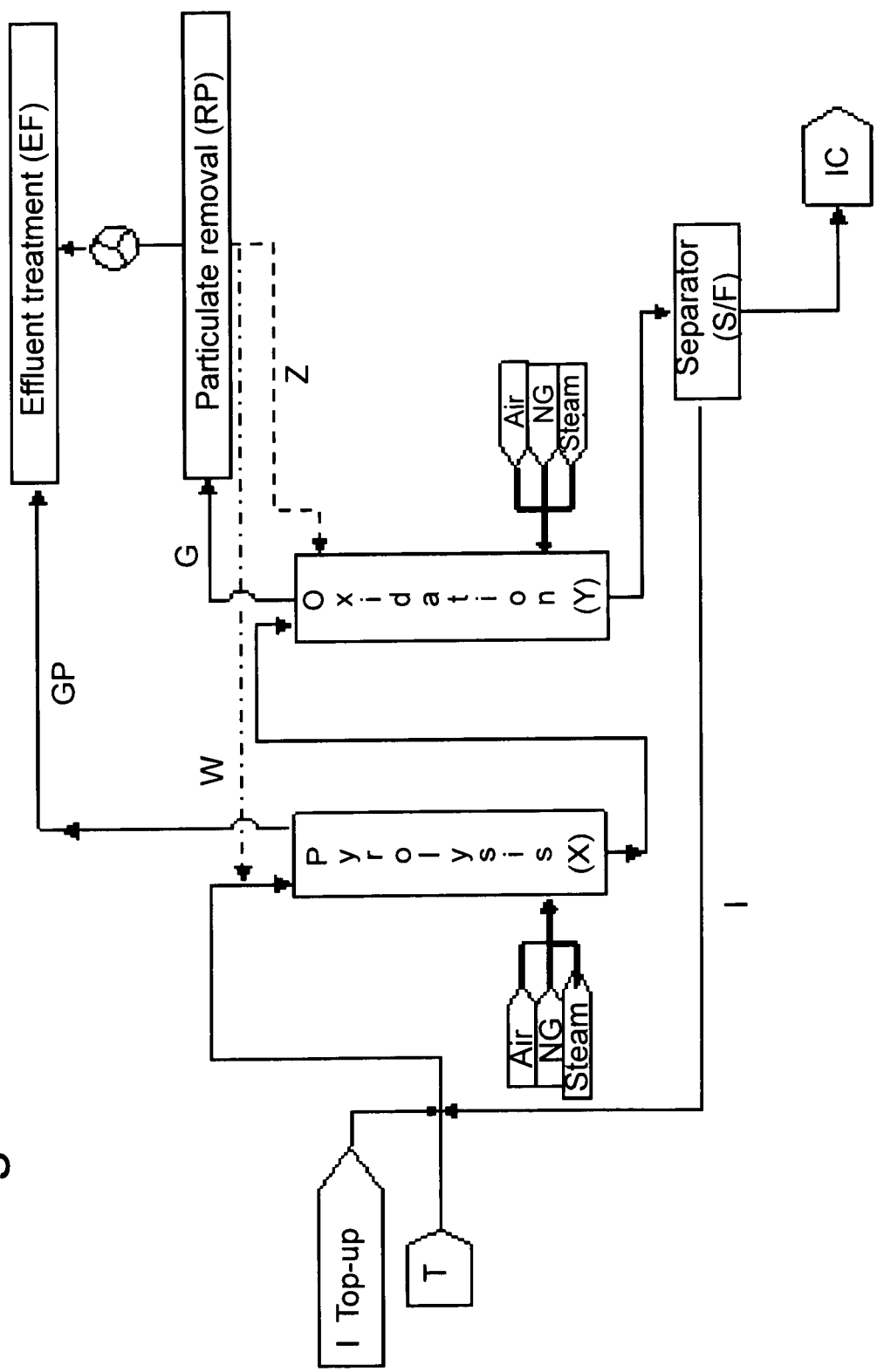
FIG. 5 shows a schematic describing a secondary thermal treatment effected in two vessels.

FIG. 5 schematizes the secondary thermal treatment effected in two vessels.

The cake (T), possibly dried, is subjected to pyrolysis in a pyrolysis furnace (X) in the presence of sub-stoichiometric air, natural gas or equivalent gas (NG) and vapour, then to oxidation (Y) in a second furnace by means of air, natural gas or equivalent gas and vapour.

The treated cake leaving the second furnace is subjected to separation (S/F) in order to separate the inert products (I), which are recycled upstream of the pyrolysis, from the inorganic ashes (IC).

The gases leaving the pyrolysis section, pyrolysis gas (GP), (H2, $CH_4$, CO, etc.) and the gas leaving the oxidation section (G), after removing the particulate re-introduced (Z) in the oxidation and/or possibly recycled (W) upstream of the pyrolysis, are subjected to an effluent treatment (EF) (for example post-combustion plus removal of $SO_x/NO_x$).

The invention claimed is:

1. A process for recovering metals from a stream rich in hydrocarbons and carbonaceous residues, comprising:
    sending said stream to a primary treatment effected in one or more steps, wherein said stream is treated in the presence of a fluxant agent at a temperature ranging from 80 to 180° C. and subjected to liquid/solid separation to obtain a clarified product consisting essentially of a liquid portion and a cake;
    optionally subjecting the separated cake to drying to remove the hydrocarbon component having a boiling point lower than 350° C. from the cake;
    sending the cake to a secondary thermal treatment comprising:
    flamelessly pyrolyzing the cake at between 400 and 800° C. to form a pyrolysis residue, wherein an inert solid is added to the cake during the pyrolyzing;
    oxidizing the pyrolysis residue in an oxidizing environment and at temperatures ranging from 400 to 800° C.;
    wherein the secondary thermal treatment is effected in one or more multiple hearth furnaces having rabbling arms with teeth at least partially immersed in an inert bed.

2. The process according to claim 1, wherein the fluxant agent is at least one of vacuum gas oil and light cycle oil.

3. The process according to claim 1, wherein the primary treatment is effected at a temperature of 100 to 160° C.

4. The process according to claim 1, wherein the primary treatment is effected in a single step, wherein the fluxant agent is co-current with the stream.

5. The process according to claim 1, wherein the primary treatment is effected in two or more steps wherein the fluxant agent is counter-current with the stream, the solid separated in the separation is sent to the secondary thermal treatment, and the liquid separated in the separation is recycled, as fluxant agent, to the primary treatment.

6. The process according to claim 1, wherein the primary treatment is carried out in at least one selected from the group consisting of a filter press, a centrifuge, and a decanter centrifuge.

7. The process according to claim 1, wherein the primary treatment is effected in a centrifuge decanter.

8. The process according to claim 6, wherein there are from 2 to 5 primary treatment steps.

9. The process according to claim 1, wherein the pyrolyzing is carried out at a temperature ranging from 500 to 670° C.

10. The process according to claim 1, wherein the pyrolyzing is effected in the presence of air, vapour, natural gas or equivalent gas, the air being in a sub-stoichiometric quantity.

11. The process according to claim 1, wherein the oxidizing is effected at a temperature ranging from 500 to 700° C.

12. The process according to claim 1, wherein the oxidizing is effected in the presence of air, steam and natural gas or equivalent gas.

13. The process according to claim 1, wherein, the pyrolyzing and the oxidizing are carried out in the same equipment.

14. The process according to claim 2, wherein, between the pyrolyzing and the oxidizing, a cooling stripping step is effected.

15. The process according to claim 14, wherein the cooling stripping is effected by means of vapour.

16. The process according to claim 1, wherein, between the pyrolyzing and the oxidizing, a cooling step is performed.

17. The process according to claim 1, wherein the drying is carried out by moving the cake under heat in an inert atmosphere, at temperatures of up to 350° C. and pressures of 1 bar or under vacuum up to 0.05 bar.

18. The process according to claim 17, wherein the drying is carried out with the fluxant agent and an inert gas.

19. The process according to claim 14, wherein the pyrolyzing is carried out with a number of rabbling arms higher than a number of rabbling arms during the oxidizing.

20. The process according to claim 1, wherein when the process is carried out in a succession of ovens the rotation rate of pyrolysis ovens is higher than the rotation rate of an oxidation oven.

21. The process according to claim 1, wherein flamelessly pyrolyzing the cake removes hydrocarbons present in the cake and forms a carbonaceous residue.

22. The process according to claim 1, wherein flamelessly pyrolyzing the cake forms a pyrolysis residue that is free of hydrocarbons and comprises a carbonaceous residue.

* * * * *